May 19, 1970 W. RAPPOLT 3,512,511
APPARATUS FOR REDUCING NOXIOUS COMPONENTS OF THE EXHAUST
GASES OF INTERNAL COMBUSTION ENGINES
Filed Feb. 26, 1968 2 Sheets-Sheet 1
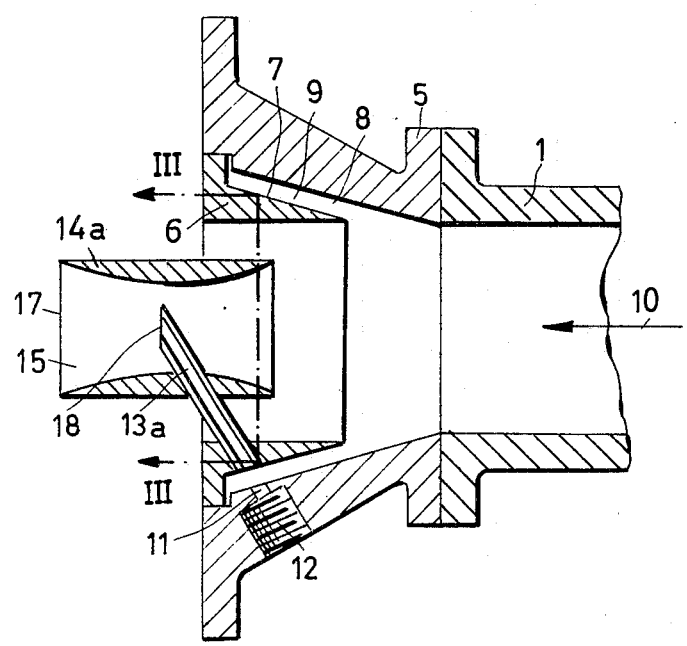
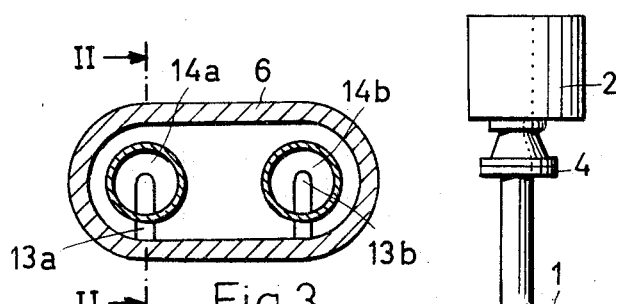
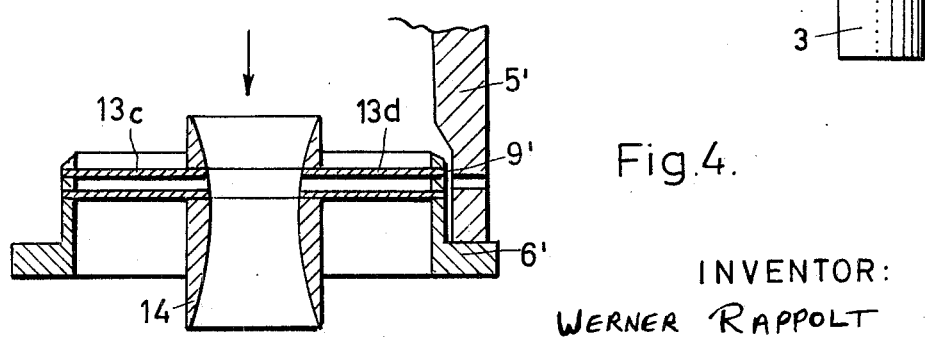
INVENTOR:
WERNER RAPPOLT
By Kurt Kelman
AGENT

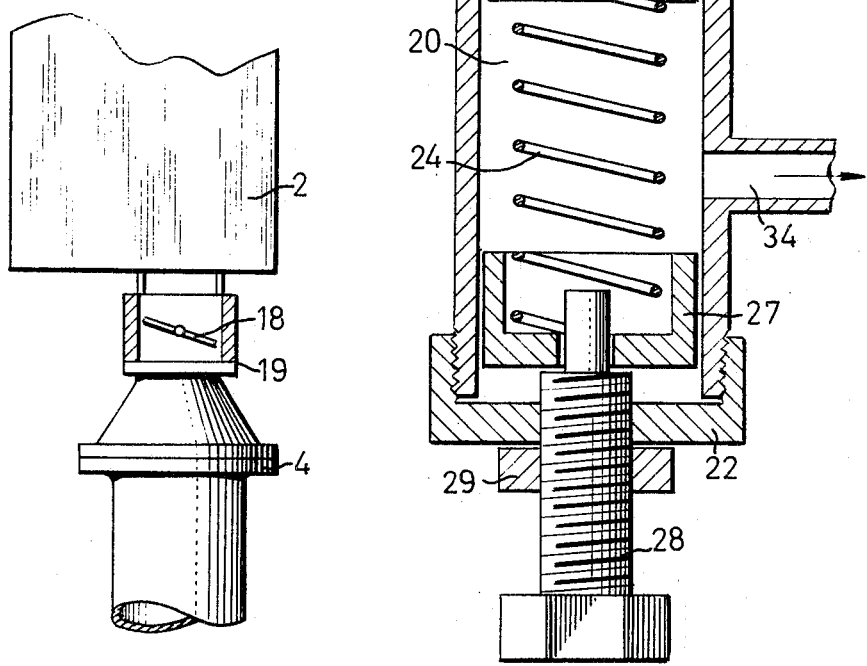

United States Patent Office 3,512,511
Patented May 19, 1970

3,512,511
APPARATUS FOR REDUCING NOXIOUS COMPONENTS OF THE EXHAUST GASES OF INTERNAL COMBUSTION ENGINES
Werner Rappolft, Mittelweg 20, Frankfurt am Main, Germany
Filed Feb. 26, 1968, Ser. No. 708,086
Int. Cl. B01f *3/02;* F02m *7/00*
U.S. Cl. 123—131                    6 Claims

ABSTRACT OF THE DISCLOSURE

A venturi tube extends along the fuel-air mixture stream in the suction line leading from the carburetor to the engine cylinder head of an internal combustion engine, and a tube discharges atomized fuel condensate collected in an annular groove in the suction line wall in admixture with air at the constricted portion of the venturi tube.

BACKGROUND AND SUMMARY OF THE INVENTION

The present invention relates to apparatus for reducing or removing noxious components of the exhaust gases of an internal combustion engine.

In such apparatus, a suction line leads from the outlet of a carburetor to the inlet of an engine cylinder head to carry a fuel-air mixture stream from the carburetor to the engine cylinder head. It has been proposed to collect fuel condensate of this mixture in an elongated annular groove in the suction line wall, and to return atomized condensate back from this collecting groove into the stream by a tube. However, experience has shown such arrangements to be only partially successful in preventing noxious carbon monoxide formation, and even less successful in preventing or reducing the formation of hexanes in the exhaust gases, which are primarily responsible for air pollution and smog.

It is the primary object of this invention to provide simple means involving no substantial reduction in the effiicency of the motor and no reduction in the fuel portion of the fuel-air mixture but further reducing the carbon monoxide component of the exhaust gases and largely preventing the formation of hexanes.

The above and other objects are accomplished in accordance with the invention by mounting a venturi tube in the fuel-air mixture stream to extend along this stream in the direction thereof, and the tube carrying the atomized condensate back into this stream by opening into the venturi tube at the constricted portion thereof. Preferably, the tube opens at the axis of the venturi tube.

The venturi tube has a smooth outer surface and its dimensions may be so small that no practically noticeable loss of efficiency is caused by its arrangement, the venturi tube being freely mounted in the fuel-air mixture stream and carried by the tube or tubes which discharge the atomized condensate thereinto.

This arrangement produces an atomization of the fuel-air mixture in the suction line of a degree not heretofore achievable so that the engine cylinder receives a very finely atomized mixture.

In one particular embodiment, a throttle valve in the suction line is so operated that undue enrichment of the fuel-air mixture is avoided while the motor operates at high speed and the carburetor idles.

BRIEF DESCRIPTION OF THE DRAWING

The above and other objects, advantages and features of the present invention will become more apparent in the following detailed description of certain preferred embodiments thereof, taken in conjunction with the accompanying drawing wherein FIG. 1 is a schematic illustration showing the apparatus including the carburetor, the engine cylinder head and the suction line connecting the same;

FIG. 2 is a section along line II—II of FIG. 3 to show one embodiment of the apparatus for reducing noxious components in the exhaust gases;

FIG. 3 is a section along line III—III of FIG. 2;

FIG. 4 shows a section similar to that of FIG. 2 of another embodiment;

FIG. 5 illustrates an additional feature of the apparatus according to this invention; and FIG. 6 shows the operating means for this additional feature, in cross section.

DETAILED DESCRIPTION

FIG. 1 schematically shows a carburetor 2, an engine cylinder head 3 of an internal combustion engine and a suction line 1. The suction line leads from the carburetor outlet to the cylinder head inlet for carrying a fuel-air mixture stream from the carburetor to the cylinder head in a manner well known per se, and requiring no further illustration or explanation.

The apparatus for reducing or removing noxious components of the exhaust gases is indicated at 4. In the illustrated embodiment, this apparatus is arranged immediately adjacent the carburetor outlet. However, according to this invention, it may also be arranged immediately adjacent the engine cylinder head inlet, or anywhere in the suction line between the carburetor outlet and the engine cylinder head inlet.

One embodiment of apparatus 4 is shown in FIGS. 2 and 3. It includes an outer annular body 5 carrying a coaxial inner annular body 6. The outer tubular body 5 has two end flanges for attachment to two matching flanges in the wall of suction line 1 so that the body 5, in effect, forms a part of the suction line wall, the illustrated body 5 being frusto-conical and defining an inner surface 8 flaring outwardly in the direction of flow of the fuel-air mixture stream indicated by arrow 10. The outer surface 7 of the inner annular body 6 is also frusto-conical, the surfaces 7 and 8 defining annular groove 9 in the wall of the suction line. This elongated groove extends in the direction of the fuel-air mixture stream and is closed at its inner end by a radially extending flange connecting the inner annular body 6 to the outer annular body 5. Fuel condensate of the fuel-air mixvture is collected in the elongated annular groove 9 when the mixture flows in the direction of arrow 10.

A port 11 connects groove 9 with the amtosphere or any other suitable source of air, and a nozzle 12 in this port regulates the air flow into the groove to atomize the fuel condensate therein. A tube 13a is mounted in the body 6 so that it extends into the fuel-air mixture stream in the direction of its flow, one end of the tube being in communication with the groove 9 and the other end opening into the fuel-air mixture stream. In this manner, the tube 13a carries the atomized condensate back into this stream to be carried along by the stream to the engine cylinder head in gaseous form.

According to the present invention, a venturi tube 14a extends along the fuel-air mixture stream and in the direction thereof, and the tube 13a opens at the axis of the venturi tube at the constricted portion thereof. As illustrated, tube 13a carries venturi tube 14a whose outer surface is smooth and whose inner passage 15 has a constricted portion. It is advantageous for the venturi tube to have a downstream outlet 17 of larged cross section than that of its upstream inlet 16.

As shown in FIG. 3, the cross section of the suction line is elongated, i.e. oval, in this embodiment, and a pair of venturi tubes 14a, 14b are arranged symmetrically on either side of the axis of the suction line, each being carried by a respective tube 13a, 13b.

In the embodiment shown in FIG. 4, the annular bodies 5', 6' are cylindrical and define a cylindrical groove 9' therebetween. A single venturi tube 14 extends along the center or axis of the fuel-air mixture stream flowing through the suction line, the venturi tube being carried by two tubes 13c, 13d.

FIGS. 5 and 6 illustrate an arrangement designed to prevent undue enrichment of the fuel-air mixture when the motor runs at a high speed while the carburetor is in idling position. For this purpose, a throttle valve 18a is arranged in a cylindrical body 19 between the carburetor 2 and the apparatus 4 described hereinabove. The throttle valve, which is mounted in the suction line in the path of the fuel-air mixture stream between the carburetor outlet and the annular groove of apparatus 4, is operated by means responsive to the pressure in the suction line. This means may be electrical or mechanical, a specific pressure responsive mechanical valve operating means being shown in FIG. 6.

A cylindrical housing 20 is closed on top and at the bottom by closures 21 and 22, a stepped control piston 23 being arranged in housing 20 so that atmospheric pressure is exerted only upon a portion (about one quarter) of the piston surface in the closed position while the atmospheric pressure is exerted upon the entire piston surface in the open position. The piston is biased by compression spring 24 in the closed position, wherein the valve head 25 of the piston is pressed against the valve seat 26 in closure 21. The spring pressure may be adjusted by turning set screw 28 in nut 29, the set screw carrying the spring abutment 27 so that it may be axially moved within cylindrical housing 20. An inlet conduit 34 connects a portion of the suction line immediately adjacent the carburetor 2 to the interior of cylindrical housing 20 below the piston 23 to transmit the pressure from the suction line to one side of the piston, the other side receiving atmospheric pressure through inlet port 30 in closure 21.

A piston rod 31 extends from the piston through the inlet port 30 and is linked to push rod 32 connected to the axle of throttle valve 18a to move the valve between an open and closed position.

For instance, if the engine idles with a pressure of 500 torr in the suction line, the tension of spring 24 is so adjusted that the piston 23 is moved away from the closure 21 so as to open the valve between valve head 25 and valve seat 26 only at a pressure of 520 torr. Thus, the valve does not operate during the normal operation of the engine. However, when the low pressure in the suction line is suddenly increased by stopping gas flow at high motor speed, the pressure transmitted through conduit 34 results in the piston 23 being sucked into the cylindrical housing 20 against the pressure of spring 24. This causes the valve 25, 26 to be opened so that air may flow into the cylinder against the piston whose entire surface is now under atmospheric pressure. This movement of the control piston is transmitted to the throttle valve 18a by rods 31, 32 so that the same is abruptly moved from the open position (shown in full lines in FIG. 6) to the closed position (shown in broken lines). This prevents the low pressure from affecting the carburetor and thus prevents undue enrichment of the fuel-air mixture during idling.

While the invention has been described hereinabove in connection with certain now preferred embodiments, it will be clearly understood that many modifications and variaitons may occur to those skilled in the art, particularly after benefiting from the present teaching, without departing from the spirit and scope of this invention as defined in the appended claims.

What is claimed is:

1. In an apparatus for reducing noxious components of the exhaust gases of an internal combustion engine, comprising a carburetor having an outlet, an engine cylinder head having an inlet, a suction line having a wall leading from the carburetor outlet to the cylinder head inlet for carrying a stream of a fuel-air mixture from the carburetor to the engine cylinder head, the wall of the suction line defining an elongated annular groove wherein condensate of said mixture collects, a venturi tube extending along the stream and in the direction thereof, and a passage in communication with said groove and opening into the venturi tube at the constricted portion thereof, the improvement of an air supply port opening into the groove and delivering air thereto whereby an atomized condensate-air mixture is carried back into said stream from the groove.

2. In the apparatus of claim 1, a nozzle in said air supply port for regulating the air flow into the groove.

3. In the apparatus of claim 1, wherein said suction line is of elongated cross section, and comprising two of said venturi tubes and two of said passages, each passage opening into a respective one of said venturi tubes.

4. In the apparatus of claim 1, the venturi tube having a downstream outlet of larger cross section that that of the upstream inlet.

5. In the apparatus of claim 1, a throttle valve mounted in the suction line in the path of said stream between the carburetor outlet and said groove, and means responsive to the pressure in the suction line for operating the throttle valve.

6. In the apparatus of claim 5, wherein said pressure responsive means comprises a spring-biased piston having two opposite ends, one piston end being under atmospheric pressure and the other piston end being under the pressure of the suction line, and a coupling operatively connecting the piston to the throttle valve.

References Cited

UNITED STATES PATENTS 1,580,634  4/1926  Ball _____ 48—180

FOREIGN PATENTS 138,100  6/1920  Great Britain.
556,726  4/1923  France.
339,436  7/1921  Germany.

WENDELL E. BURNS, Primary Examiner

U.S. Cl. X.R.

48—180; 261—1